United States Patent [19]
Hughes

[11] 3,809,108
[45] May 7, 1974

[54] MONITOR AND AUTOMATIC SHUTOFF FOR GAS REGULATORS

[75] Inventor: George C. Hughes, Anderson, Ind.

[73] Assignee: Textron Inc., Providence, R.I.

[22] Filed: Apr. 16, 1973

[21] Appl. No.: 351,804

[52] U.S. Cl.......... 137/73, 137/505.46, 137/505.47, 137/614.21
[51] Int. Cl...................... G05d 16/06, F16k 31/14
[58] Field of Search............ 137/73, 75, 116.5, 461, 137/505.46, 505.47, 613, 614.11, 614.19, 614.21

[56] References Cited
UNITED STATES PATENTS
3,613,725  10/1971  Hughes.............................. 137/613

Primary Examiner—Alan Cohan
Assistant Examiner—George L. Walton
Attorney, Agent, or Firm—Arthur A. Johnson

[57] ABSTRACT

There is disclosed a gas regulator having a resiliently positioned orifice sleeve adapted to yield in the event foreign matter becomes lodged between it and the diaphragm-operated regulator valve and to move to a position in which an auxiliary valve functions to regulate the flow of gas between the inlet and outlet of the regulator, the auxiliary valve being movably mounted and being moved in response to a determinate pressure differential resulting from excessive gas flow through the regulator from any cause to shut off gas flow until the auxiliary valve member is manually reset; the auxiliary valve means may include means for causing it to engage the orifice tube automatically in case it is excessively heated as by fire.

8 Claims, 8 Drawing Figures

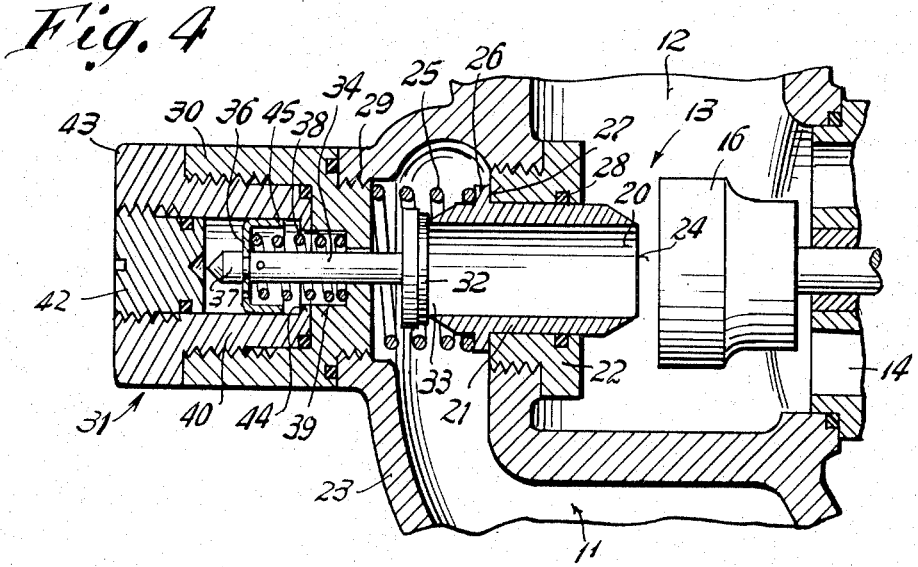
Fig. 4
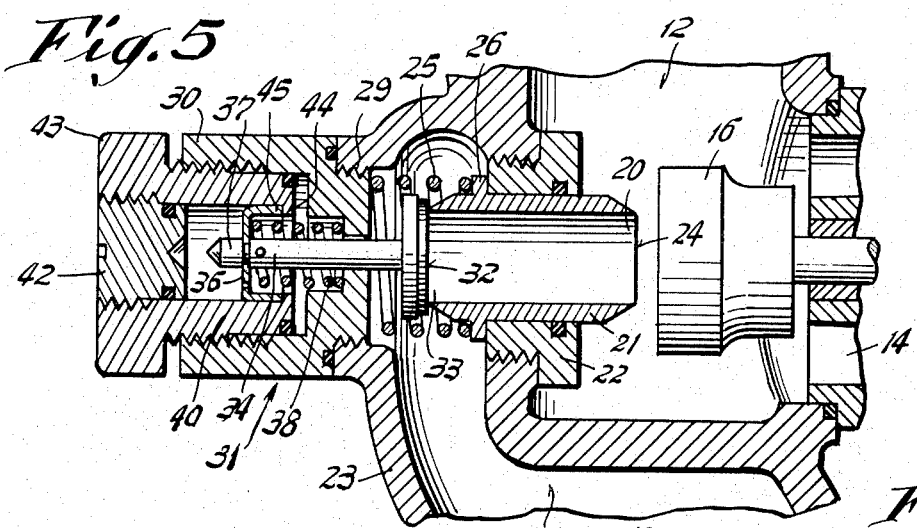
Fig. 5
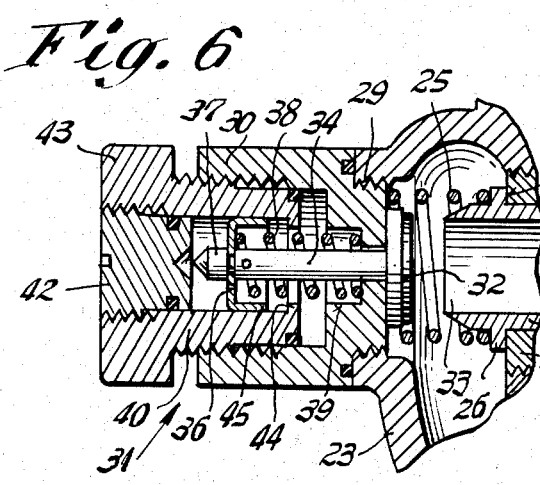
Fig. 6
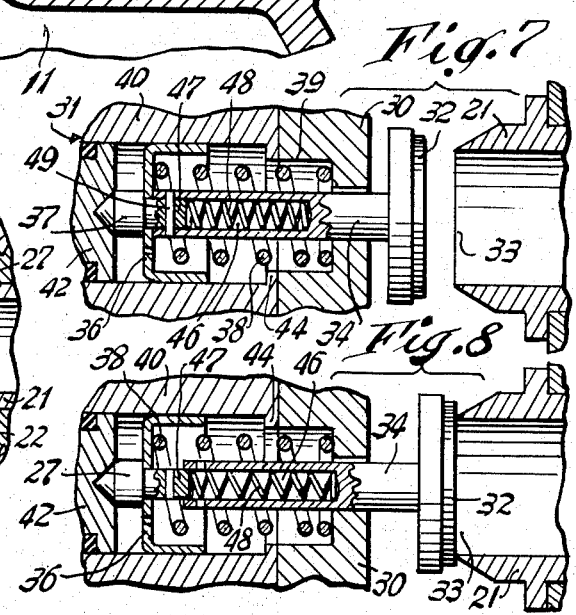
Fig. 7
Fig. 8

MONITOR AND AUTOMATIC SHUTOFF FOR GAS REGULATORS

This invention relates to fluid pressure regulators and more particularly to improved means for monitoring the regulator if foreign matter in the gas or structural failure or defects in the valve means prevents the regulator valve seat from engaging the orifice between the upstream and downstream side of the regulator, in which case gas would continue to flow past the valve and cause the gas to continue to flow through the regulator and build up the pressure downstream and under the regulator diaphragm. One hazard could be excessive pressure on appliances being served and another hazard could be the discharge of an excess flow of gas through the usual vent in the regulator to the atmosphere which would be a serious hazard in certain installation areas. Such safety controls for regulators are illustrated and described in my U.S. Pat. No. 3,613,725 in which the valve means includes an orifice sleeve which is normally resiliently positioned so that, should foreign matter, or other failure of the valve means, prevent the valve from closing, auxiliary valve means would restrict the flow of the gas and thus reduce the pressure in the downstream line.

This is accomplished in the form of the invention herein described and claimed by a novel valving construction in which an orifice sleeve is slidable in the valve port and is normally resiliently urged by a spring to a projecting position in which it is engaged by the valve seat. In the event that there is a valve failure or that foreign matter comes between the valve seat and the upstream orifice of the orifice sleeve so as to prevent the valve from being closed with the result that gas can flow through the valve into the regulator and downstream at high pressure, the overpressure on the regulator diaphragm will cause said regulator valve seat to press against it and move the sleeve in upstream direction against the pressure of its spring toward an auxiliary valve more or less in response to the diaphragm of the regulator and thus continue the regulation.

Further, according to the present invention, the auxiliary valve seat performs an additional function, that is to completely shut off the flow of gas if from any cause the diaphragm-operated valve fails to function and the flow through the regulator becomes excessive. The excess flow shutoff may be caused by such common failures as broken or dug up gas lines, external failure of the regulator causing the diaphragm valve to be wide open or by an internal failure which could also cause the valve to remain wide open.

In the form shown, the auxiliary valve of the present invention is spring biased to normal working position. However, when there is excess flow of gas through the regulator the differential pressure across the auxiliary valve will overcome its spring and cause said valve to engage the upstream orifice and permanently stop the flow of gas through the orifice sleeve to the downstream side of the regulator. This condition continues until the auxiliary valve is manually reset by means provided by the present invention for that purpose which are accessible from the exterior of the regulator.

In the event of the regulator becoming dangerously overheated, means are provided by the present invention for causing said auxiliary valve seat to completely close the upstream orifice of the orifice sleeve even though the diaphragm is and other parts of the regulator are inoperative or destroyed.

For this purpose the auxiliary valve unit is provided with a spring normally restrained by a fusible element for moving its valve seat against the upstream orifice when the fusible element is melted.

Other features and advantages of the invention will be apparent from the specification and claims when considered in connection with the accompanying drawings in which:

FIG. 4 is like FIG. 3 but with the diaphragm valve seat retracted.

FIG. 5 is like FIG. 4 except that the orifice sleeve has returned to its normal position but the auxiliary valve still prevents the flow of gas.

FIG. 6 shows the auxiliary valve seat released manually from the exterior of the regulator.

FIG. 7 is like FIG. 1 but shows the auxiliary valve with a fusible pin and an internal spring, said valve being in its normal open position.

FIG. 8 is like FIG. 7 but with the auxiliary valve closing the upstream orifice.

Figure 1:
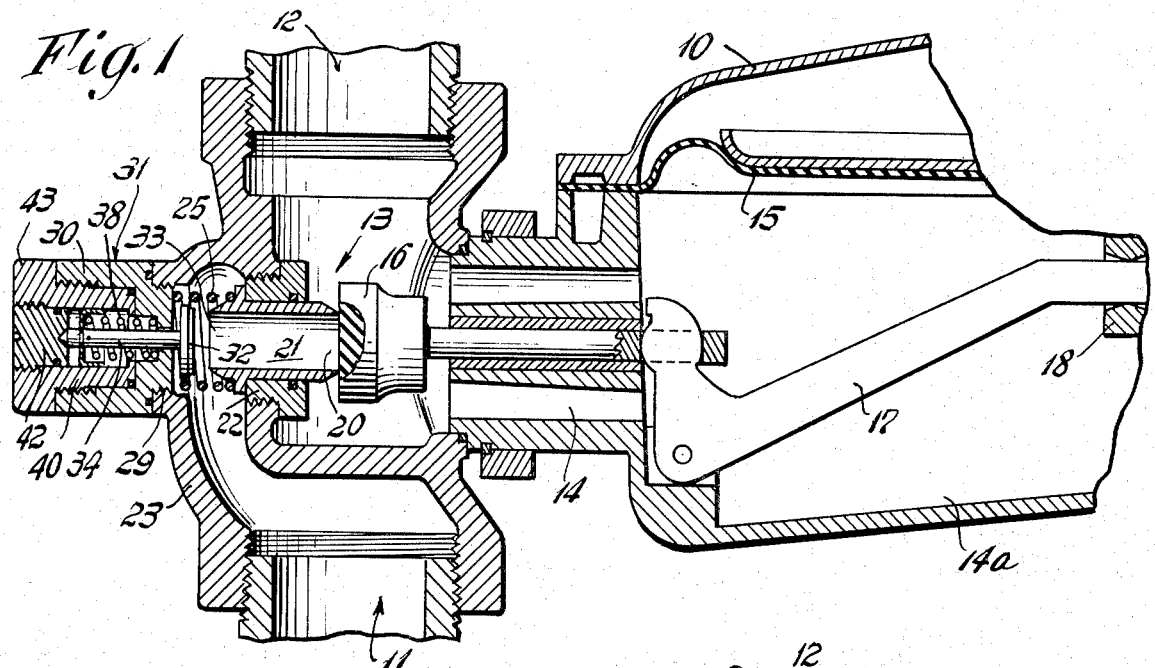
FIG. 1 is a vertical section through a portion of a gas regulator showing the monitoring and safety apparatus of the present invention in normal operating position with the diaphragm valve seat in closed position.

As shown in the drawings, the regulator 10 has an inlet 11, outlet 12 and a valve means 13 for controlling the flow of gas between the inlet and outlet and also has passages 14 between the outlet passage 12 and regulator pressure chamber 14a, which is closed by the usual flexible pressure-responsive diaphragm 15 and in which a valve seat 16 is actuated by a bell crank 17 operating on a valve stem 18 for moving the valve seat 16 into a closed or sealing position with a downstream orifice 20 as shown in FIG. 1 in response to the pressure in the pressure chamber 14a in the regulator.

For the purpose of illustrating the present invention, the failure of the valve means will be described as occurring because of the presence of a particle of foreign matter P lodged between the valve seat 16 and orifice 20. As shown in the drawings, the valve means 13 includes an orifice sleeve 21 slidably mounted in the bushing 22 carried by the regulator housing 23. The end of the sleeve 21 has a chisel edge 24 defining the downstream orifice 20. The sleeve 21 is normally urged by a coiled spring 25 to the normal projecting position shown in FIG. 1 in which a flange 26 engages the end 27 of the bushing 22. An O-ring 28 seals the sleeve 21 in the bushing 22.

According to the present invention regulator housing 23 has a threaded hole 29 which receives and holds a housing extension 30. As shown in FIG. 1, the coils of the spring 25 are spaced apart a sufficient distance so as to permit the flow of gas at all times from the inlet 11 to the orifice sleeve 21 in all positions of the latter.

Figure 2:
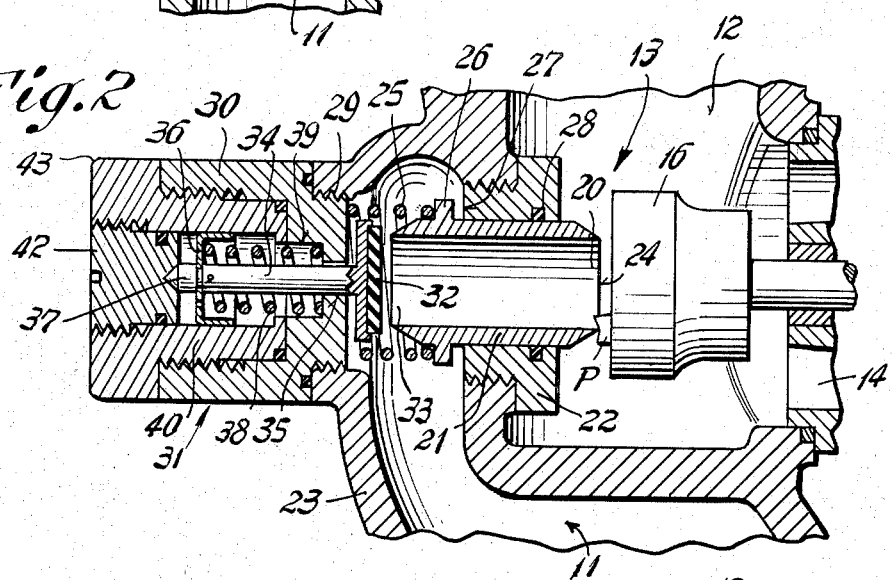
FIG. 2 is a similar view showing a particle of foreign material (somewhat enlarged) interposed between the valve seat and the downstream orifice, the orifice sleeve having been moved and the upstream orifice cooperating with the auxiliary valve seat in monitoring the flow of gas.

When the valve seat 16 is in the position shown in FIG. 1, it engages the chisel edge 24 of the downstream orifice 20 of the sleeve 21 closing the orifice and the flow of gas is stopped, the valve seat being in its sealed or locked-up position. In normal operation the valve seat 16 is spaced from the orifice 20 more or less and moved toward and from the orifice 20, in response to the pressure on the diaphragm 15, to regulate the pressure within the desired limits. However, should foreign matter such as a particle P, for instance, be disposed between the valve seat 16 and the downstream orifice 20 of the sleeve 21 which projects beyond the bushing 22, it will prevent closing of the valve seat on the orifice 20, as shown in FIG. 2. Continued pressure by the valve seat 16 on the sleeve 21, as caused by the diaphragm 15 and bell crank 17, will overcome the force of the spring 25 and regulation by the valve seat 16 and orifice 20 will cease.

To continue to regulate the pressure of gas flowing through the regulator, the present invention provides a monitoring valve mechanism 31 which, in the form of the invention shown, is located in the housing extension 30. The valve mechanism 31 comprises an auxiliary valve seat 32 adapted to cooperate with an upstream orifice 33 on the orifice sleeve 21, as will appear below. The valve seat 32 is mounted on a stem 34 which is slidably mounted in a bearing 35 in the housing extension 30. The one end of the valve stem 34 has a cup 36 secured to it by a head 37. One end of a spring 38 engages said cup 36 and the other end lies in a recess 39 in the housing extension 30. The spring 38 yieldingly holds the valve seat 32 in a position determined by the position of a plug 40 screw threaded in the housing extension 30 and engaging the head 37 of the valve stem 34. In this position the space between the orifice 33 and the valve seat 32 permits the maximum flow rate of gas at a given inlet pressure, the valve seat 16 regulating the flow under normal conditions.

When, however, a particle of foreign matter P, for instance becomes lodged between the valve seat 16 and the downstream orifice 20, as shown in FIG. 2, the valve seat 16 can no longer regulate the flow of gas.

If this happens, the valve closing movement of the valve seat 16 through the particle P forces the orifice sleeve 21 to move against the tension of the spring 25 to bring the upstream orifice 33 more or less close to the auxiliary valve seat 32 to subject the flow of gas to the normal flow rate and pressure. A normal increase in demand would cause the valve seat 16 to recede from the orifice 20 and could cause foreign particles to fall away from the valve seat, in which case the valve seat 16 would continue to perform its regulatory functions.

Figure 3:
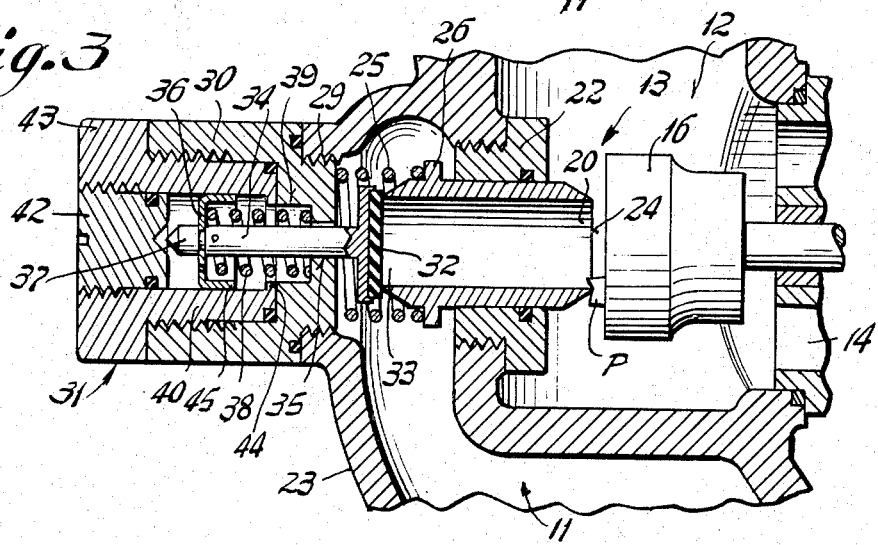
FIG. 3 is like FIG. 2 but showing the upstream orifice engaging the auxiliary valve seat to momentarily cut off the flow of gas.

If, while the foreign particle is still lodged between the seat 16 and the orifice 20, and the pressure under the diaphragm increases, the orifice sleeve 21 will be moved more or less closer to the auxiliary valve seat 32 which then acts as a monitor, as shown in FIG. 2. If the required flow is "no-flow" or the pressure continues to increase, the orifice sleeve 33 will be moved by the foreign matter on the valve seat 16 to bring the chisel-edged upstream orifice 33 into direct contact with the auxiliary valve seat 32 and close the orifice 33 so that the regulator is locked-up and no gas can flow between the inlet 11 and outlet 12 as shown in FIG. 3.

Once the valve seat 32 engages the upstream orifice 33 the differential pressure against the upstream side of the valve seat 32 will not permit the spring 38 to withdraw the valve seat 32 from the orifice 33, regardless of the fact that the sleeve 21 may have returned to its normal position with the flange 26 engaging the bushing 27 as shown in FIG. 4.

It will be seen, therefore, that the novel safety control of the present invention has a valving structure that will stop or greatly reduce the flow of gas so that any slight leakage can be discharged through the vent of the regulator without any serious danger.

While Applicant's regulator is a fail-safe device, causing the auxiliary valve seat and the upstream orifice to lock-up, when it is safe to reestablish service, means are provided by the present invention for disengaging the auxiliary valve seat 32 from the upstream orifice 33. The means for doing this comprises the plug 40 which, as stated above, is screw threaded into the housing extension 30 and which has a screw 42 which normally engages the head 37 of the auxiliary valve stem 34.

If the valve seat 32 should lock up on the orifice 33 as shown in FIG. 5, it is merely necessary to engage the head 43 of the plug 40 to turn the latter counterclockwise about two turns until the lip 44 of the plug 40 engages the rim 45 of the cup 36 and pulls the valve seat 32 away from the orifice 33 allowing gas at the upstream pressure to enter the regulator, the spring 38 returning the auxiliary valve seat 32 to its normal position shown in FIG. 6. As soon as this happens, the plug 40 is rotated clockwise to a normal operating position shown in FIG. 2.

To preset the travel of the auxiliary valve, the screw 42 is turned until the auxiliary valve seat 32 seats on the orifice 33 and is then backed off a determinate extent depending on the pitch of the threads to a position giving maximum flow clearance between the orifice 33 and the auxiliary valve seat 32. Screw 42 can also be adjusted to position the auxiliary valve seat 32 so that excess flow shut-off occurs at lesser flows than maximum.

As stated above, the present invention also incorporates means for stopping the flow of gas beyond the inlet of the regulator in case the latter is excessively heated by fire.

For this purpose the auxiliary valve stem 34, as shown in FIGS. 7 and 8, has an elongate axial cavity 46 into which extends a stud 47 attached to the head 37 and cup 36. In the cavity 46 there is an expansion spring 48 which engages the end of the cavity and the stud 47. The stem and the stud are coupled by a pin 49 so as to normally move as one. However, the pin 49 is made of fusible material so that when excessively heated, as in a fire, the pin will disintegrate and allow the spring 48 to advance the valve seat 32 and cause it to shut off the upstream orifice 33.

Variations and modifications may be made within the scope of the claims and portions of the improvements may be used without others.

I claim:

1. A safety control for fluid pressure regulators having a housing, an inlet and an outlet for a fluid, a pressure-responsive diaphragm on the housing and valving means responsive thereto for controlling the flow of fluid between said inlet and outlet, the improvement wherein said valving means comprises an orifice sleeve movably mounted on said housing and having an end portion forming a downstream orifice, a diaphragm-operated valve seat mounted on a movable valve stem engaging the downstream orifice of the sleeve to close said orifice in response to a predetermined pressure of fluid in the regulator, said sleeve being mounted by resilient means whereby increased pressure in said regulator due to failure of said diaphragm-operated valve seat to shut off the downstream orifice causes said resilient means to yield to cause flow-controlling means operated by said sleeve to close and restrict the flow of fluid resulting in the reduction of the pressure in the regulator, said flow control means comprising an upstream orifice on said sleeve and a cooperating auxiliary valve seat to regulate the flow of fluid through the orifice sleeve, said auxiliary valve seat being mounted on a movable auxiliary valve stem, the latter being mounted by resilient means whereby a determinate excessive increase in pressure under the diaphragm of the regulator causes said last-named resilient means to yield and said auxiliary valve seat to engage said upstream orifice and shut off flow of fluid to the orifice sleeve.

2. A safety control for fluid pressure regulators according to claim 1 in which there are means operable from the exterior of the housing for disengaging said auxiliary valve seat from said upstream orifice and restore the diaphragm-operated valve seat to its normal functions.

3. A safety control for fluid pressure regulators according to claim 1 in which the auxiliary valve seat is a disk, the obverse side of which engages said upstream orifice and said orifice is kept closed by the higher fluid pressure on the reverse side of said disk.

4. A safety control for fluid pressure regulators according to claim 3 in which there are means operable from the exterior of the housing for overcoming said differential pressure and disengaging said disk from the upstream orifice.

5. A safety control for fluid pressure regulators according to claim 1 in which said auxiliary valve stem is slidably mounted in a housing extension in axial alignment with said orifice sleeve, a plug threaded in said housing extension, guide means secured to the auxiliary valve stem and slidably mounted on said plug, said resilient means for mounting said auxiliary valve stem comprising an expansion spring located on said auxiliary valve stem between the end of said housing extension and said guide means and normally holding the auxiliary valve seat spaced from said upstream orifice, and an adjustable means mounted in said housing extension engaging the end of said valve stem to vary said normal position of said auxiliary valve stem and auxiliary valve seat relative to said upstream orifice.

6. A safety control for fluid pressure regulators according to claim 5 in which there are means in said plug when the latter is backed off said housing extension to engage said guide means and pull said auxiliary valve seat off said upstream orifice to return asid auxiliary valve seat to its normal position.

7. A safety control for fluid pressure regulators according to claim 1 wherein there is resilient means biased to cause the auxiliary valve seat to engage and shut off the upstream orifice of said sleeve, and means restraining said last-named resilient means and responsive to heat from a fire to release said last-named resilient means to cause said auxiliary valve seat to engage and shut off the upstream orifice.

8. A safety control for fluid pressure regulators having a housing, an inlet and an outlet for a fluid, a pressure-responsive diaphragm on the housing and valving means responsive thereto for controlling the flow of fluid between said inlet and outlet, the improvement wherein said valving means comprises an orifice sleeve mounted on said housing and having an end portion forming a downstream orifice, a diaphragm-operated valve seat mounted on a movable valve stem engaging the downstream orifice of the sleeve to close said orifice in response to a predetermined pressure of fluid in the regulator, said sleeve having an upstream orifice, a cooperating auxiliary valve seat to control the flow of fluid through the orifice sleeve, resilient means biased to move said auxiliary valve seat against said upstream orifice, and means for restraining said resilient means against moving said auxiliary valve seat against said upstream orifice, said restraining means being fusil and releasing said auxiliary valve means for movement against said upstream orifice when said fusil means is fused by excessive heat caused by fire.

* * * * *